United States Patent [19]

Biale et al.

[11] 3,714,100
[45] Jan. 30, 1973

[54] CROSSLINKABLE VINYL ACETATE LATICES

[75] Inventors: Giovanni Biale, Placentia; Richard L. Pilling, Fullerton, both of Calif.

[73] Assignee: Union Oil Company of California, Los Angeles, Calif.

[22] Filed: Sept. 3, 1970

[21] Appl. No.: 69,470

[52] U.S. Cl. ................... 260/29.6 TA, 117/139.5 A 117/161 UC, 260/29.6 ME, 260/29.6 MN, 260/78.5 B, 260/78.5 E, 260/78.5 HC, 117/161 UT, 260/78.5 N
[51] Int. Cl. ............................................ C08f 45/24
[58] Field of Search ....... 260/29.6 TA, 78.5 B, 78.5 E, 260/78.5 HC, 78.5 N, 29.6 ME, 29.6 MN

[56] References Cited

UNITED STATES PATENTS

| | | | |
|---|---|---|---|
| 3,231,533 | 1/1966 | Garrett et al. | 260/29.6 TA |
| 3,262,985 | 7/1966 | Müller et al. | 260/29.6 TA |
| 3,345,318 | 10/1967 | Lindemann et al. | 260/29.6 TA |
| 3,459,698 | 8/1969 | Mantell et al. | 260/29.6 TA |

Primary Examiner—William H. Short
Assistant Examiner—L. M. Phynes
Attorney—Milton W. Lee, Richard C. Hartman, Lannas S. Henderson, Dean Sandford and Robert E. Strauss

[57] ABSTRACT

An aqueous latex of a vinyl ester polymer is described which has the property of forming crosslinkable films upon the addition of an extraneous curing additive. The latex is useful as a binder, particularly for nonwoven fibers, or for wood panel or textile coating. The polymer comprises a major proportion of a vinyl ester monomer, typically vinyl acetate, which is interpolymerized with polymerizable comonomers comprising a film-forming-temperature regulating amount of a comonomer, typically ethylene or an acrylate ester, and a minor amount of a synergistic combination of crosslinking reactive comonomers, typically diallyl maleate with N-methylolacrylamide. Treatment of the latex to reduce its pH, e.g., by addition of an acidic agent, imparts crosslinking activity to films prepared from the latex. The polymer is dispersed in an aqueous emulsion using an anionic or nonionic surfactant or mixtures thereof, typically a mixture of an alkaryl polyether alcohol and an alkali metal sulfosuccinate half ester of an ethoxylated alcohol.

25 Claims, No Drawings

CROSSLINKABLE VINYL ACETATE LATICES

DESCRIPTION OF THE INVENTION

This invention relates to emulsions of crosslinkable vinyl ester interpolymers and, in particular, relates to such interpolymers which are capable of forming films that can be cured into a highly cross-linked state.

Aqueous dispersions of polymers have found increasing acceptance for use in textiles and wood panel coating, as well as a binder of non-woven fibers, e.g., polyester fiber fills. In addition, the aqueous dispersions of such polymers have been used for sizing in the textile industry.

Latexes or aqueous dispersions of polymers must possess a diversity of properties to be acceptable for such uses. Such compositions should form films which are crosslinkable into a highly insoluble resin coating and the resultant film should resist discoloration, have a high degree of clarity and be resilient and compressible. The latexes should be stable, aqueous emulsions of the polymer and should have a sufficient viscosity and surface tension to permit spray application. Any curing agents or catalysts used with the polymer should be inexpensive and plentiful and the admixture of additive and polymer should cure rapidly and completely in a short time and at a low temperature so as to be satisfactory under most or all of a wide variety of curing conditions.

Latexes of acrylic polymers have been used in the past for this application since such polymers have been found to possess a high degree of most of the foregoing properties. Acrylic monomers, however, are relatively expensive and a distinct advantage could be achieved if the less expensive vinyl ester monomers could be substituted as the major component of such polymers. These vinyl esters, particularly vinyl acetate, offer a distinct cost advantage over acrylics; however, difficulty has been experienced in achieving stable emulsions of vinyl ester polymers which contain sufficient amounts of a crosslinking additive such as N-methylolacrylamide to attain the desired curing response. Prior investigators have reported in U. S. Pat. No. 3,301,809 that a methylolacrylamide is very difficult to copolymerize with vinyl esters and that the resultant copolymer forms unstable latexes unless a limited class of dispersing agents, the polyvinyl alcohols, are used.

Other investigators using a combination of surfactants have reported in U. S. Pat. Nos. 3,345,318 and 3,380,851 success in copolymerizing a crosslinkable monomer such as N-methylolacrylamide with an ethylene-vinyl acetate copolymer; however, the films obtained from such copolymers do not attain the degree of crosslinking and solvent resistance as attained by the interpolymers of this invention.

The objects of this invention, therefore, are to provide a vinyl ester interpolymer which is crosslinkable.

Another object of this invention is to provide said interpolymer as a stable aqueous emulsion which is readily sprayable with existing equipment.

It is a further object of this invention to provide such an interpolymer which forms clear films that resist discoloration and have a high resiliency and compressibility.

It is also a further object of this invention to provide such an interpolymer which can be treated in a simple manner to yield a composition that cures rapidly and completely into a highly crosslinked state under the wide variety of conditions commonly used for curing such polymer films.

Other and related objects will be apparent from the following description of the invention.

The foregoing objects are achieved by this invention which comprises an aqueous latex of an interpolymer comprising a major proportion of the vinyl ester interpolymerized with polymerizable comonomers including a film-forming-temperature regulating amount of a comonomer such as ethylene, acrylamide or an alkyl acrylate or methacrylate and a synergistic combination of crosslinking amounts of reactive comonomers comprising a polymerizable poly(ethylenically unsaturated) comonomer with an N-alkylol acrylamide or methacrylamide. The latex is prepared by emulsion polymerization using an emulsion stabilizing amount of an anionic or nonionic surfactant or mixture thereof.

The major monomer in the interpolymer, which comprises from about 51 to about 98 weight percent thereof, is a vinyl ester. Vinyl esters of alkanoic acids having from one to about 10 carbons can be used, and typical examples of these include vinyl formate, vinyl acetate, vinyl propionate, vinyl butyrate, vinyl isobutyrate, vinyl valerate, vinyl 2-ethyl-hexanoate, vinyl isooctanoate, vinyl nononoate, vinyl decanoate, vinyl pivalate, etc. Of the foregoing vinyl esters, vinyl acetate is the preferred monomer because of its ready availability and low cost as well as the superior properties of polymers prepared with this ester.

The vinyl ester polymers generally form films at temperatures slightly in excess of the common, ambient temperatures. The film forming temperature of a polymer can be determined by a conventional procedure. In this procedure, a film of the polymer, usually a latex film, is applied to a metal surface and permitted to dry. A temperature differential is established on the metal surface using a standardized procedure and the quality of the dried film is visually inspected. The temperature of the metal surface immediately above the temperature at the region where cracks appear in the dried film is recorded as the limiting film forming temperature. A typical polyvinyl ester, polyvinyl acetate, has a film forming temperature of about 30°C. A film-forming-temperature regulating amount of an interpolymerizable comonomer can be used to impart the desired filming temperature to the vinyl ester interpolymer. This comonomer can be used in an amount from 1 to about 25, preferably from 5 to about 20, percent of the total polymer weight, sufficient to effect an appreciable change in the film-forming temperature of the polymer.

Examples of suitable film-forming-temperature regulating comonomers include: ethylene; $C_3$ to $C_6$, $\alpha,\beta$-ethylenically unsaturated nitriles; and the $C_1$ to $C_{10}$ monohydroxy alcohol esters of acrylic and methacrylic acids. Polyethylenes can have film-forming-temperatures of $-50°$ to about $-130°C$. Polyacrylates can have film-forming-temperatures of about $-50°C$. Accordingly, ethylene and acrylic acid esters can be copolymerized with the vinyl ester to reduce the film-forming temperature of the vinyl ester polymer. The methacrylate esters and unsaturated nitriles, however, function to elevate the film-forming temperature of the vinyl ester interpolymer and can be used when it is desired to elevate the film-forming temperature of the polymer or can be used with the ethylene or acrylate esters when it is desired to slightly raise the film-forming temperatures of the interpolymers of the vinyl ester and the ethylene or acrylate esters. Examples of suitable esters include: methyl acrylate, methyl methacrylate, ethyl acrylate, isopropyl methacrylate, butyl acrylate, amyl methacrylate, 2-ethyl-hexyl acrylate, octyl methacrylate, nonyl acrylate, decyl methacrylate, etc.

The interpolymer should also contain a minor amount, from about 0.05 to 2.0, preferably from about 0.15 to about 1.0 weight percent, of each of a synergistic combination of cross-linkable interpolymerizable comonomers. The first member of this combination comprises a comonomer that is selected from the class of non-conjugated, polyethylenically unsaturated monomers. These monomers contain the ethylenic groups in non-conjugated positions and, typically, are esters of alcohols having terminally positioned ethylenic groups and/or of carboxylic acids having ethylenic groups that are in conjugated positions with the carboxyl group. Examples of these are the esters of terminally, ethylenically mono-unsaturated, $C_2$ to about $C_5$ alcohols with $\alpha,\beta$-ethylenically mono-unsaturated, $C_3$ to about $C_6$ alkendioic acids. The following are illustrative of the useful crosslinking agents: vinyl fumarate, diallyl fumarate, diallyl maleate, vinyl itaconate, dibutenyl itaconate, divinyl citraconate, etc.

The interpolymer also contains as the second member of the synergistic combination, a minor quantity of a copolymerized, N-alkylol acrylomide or methacrylamide. The amount of this reactive comonomer is from about 0.5 to about 5.0, preferably from about 1 to about 3, percent of the polymer weight. The nitrogen substituent can be any suitable alkylol group such as methylol, ethylol, propylol, butylol, 2-ethylhexylol, decylol, etc., having from about 1 to about 10 carbons preferably from 1 to about 6 carbons. The amide can be the amide of an ethylenically unsaturated carboxylic acid such as methacrylamide or acrylamide. Examples of suitable amides are: N-methylolacrylamide, N-ethylolacrylamide, N-isopropylolmethacrylamide, N-amylolacrylamide, N-hexylolacrylamide, N-decylolacrylamide, N-2-ethylhexylolacrylamide, N-nonylolmethacrylamide, etc. The preferred reagents are N-methylolacrylamide or N-methylolmethacrylamide because of their ready availability and lower cost.

The polymerization of the aforementioned monomers is performed by emulsion polymerization, generally under batchwise conditions; continuous processing can be employed if desired. The reactor used for the polymerization can be a jacketed kettle having stirring means with provisions to circulate a cooling medium through the jacket of the kettle to maintain the desired temperature. The aqueous medium is stirred to maintain dispersion of the monomers and the interpolymer in the aqueous medium. The pH of the aqueous medium can be controlled by the addition of various buffering agents and a suitable emulsifying agent of the anionic or nonionic types or combinations thereof is used in the polymerization. The amount of emulsifying agent is generally from about 0.1 to about 10, preferably from about 1 to about 5, weight percent of the monomers used in the polymerization.

A water soluble, free radical catalyst such as a water soluble peracid and salt thereof is used as the initiating catalyst and this can be used alone or in combination with an active reducing agent in a redox couple. The catalyst is used in concentration from about 0.01 to about 2, preferably from about 0.1 to about 0.5 weight percent of the monomers used in the polymerization.

If desired, the polymerization medium can also contain a minor quantity, e.g., from about 0.1 to about 5 weight percent of a protective colloid to improve the adhesiveness of the product.

With most crosslinking monomers, it is preferred not to use any buffering agent since it raises the pH of the polymerization and of the resultant latex and thereby tends to decrease crosslinking. With highly reactive comonomers, i.e., those which undergo an excessive amount of crosslinking during polymerization such that the latex becomes unstable and tends to coagulate, a buffering agent can be added to reduce the degree of crosslinking which occurs during polymerization. Any suitable buffering agent can be used to maintain the pH at a suitable value. When a buffering agent is used, the pH can be maintained at a value from about 2.0 to 7.0 and most preferably from about 2.5 to 5.0 by the addition of a buffering agent. Suitable agents comprise the alkali metal or ammonium salts of weak acids, e.g., sodium carbonate, potassium bicarbonate, lithium carbonate, potassium acid phthalate, potassium citrate, sodium acetate, potassium acid phosphate, etc.

The emulsifying agent can be any of the nonionic or anionic oil-in-water surface active agents. In the following discussion of emulsifying agents, frequent reference will be made to a cloud point of a particular agent. The cloud points which are recited are based on 1 weight percent aqueous solutions of the agent. A relatively hydrophobic agent is one having a cloud point below 190°F. and a relatively hydrophilic agent is one having a cloud point of 190°F. or above.

A single emulsifying agent can be used or the emulsifying agents can be used in combination. When combinations of emulsifying agents are used, it is advantageous to use a relatively hydrophobic emulsifying agent in combination with a relatively hydrophilic agent.

Suitable nonionic emulsifying agents include polyoxyethylene condensates represented by the following general formula:

$$R+CH_2-CH_2-O+_nH$$

wherein R is the residue of a fatty alcohol, acid, amide, or amine having from 10 to 18 carbon atoms or an alkyl phenol having from 10 to 18 carbon atoms; and where n is an integer of 1 or above and preferably between 5 and 30. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene ethyl amine and the like; and polyoxyethylene thioethers such as polyoxyethylene n-dodecyl thioether.

Some examples of nonionic emulsifying agents which can be used include a polyoxyethylene nonylphenyl ether having a cloud point of between 126° and 133°F. and marketed under the trademark "Igepal CO–630," and a polyoxyethylene nonylphenol ether having a cloud point above 212°F. and marketed under the trademark "Igepal CO–887." A similar polyoxyethylene nonylphenyl ether having a cloud point of about 86°F. is marketed under the trademark "Igepal CO–610"and is also a good emulsifying agent. Another agent is a polyoxyethylene octylphenyl ether having a cloud point of between 80°F. and 160°F. and marketed under the trademark "Triton X–100." Other emulsifying agents include a polyoxyethylene oleyl ether having a cloud point of between 80°F. and 160°F. and marketed under the trademark "Atlas G–3915," and a polyoxyethylene lauryl ether having a cloud point above 190°F. and marketed under the trademark "Brij 35."

The nonionic emulsifying agents which can be used according to this invention also include a series of surface active agents known as "Pluronics." The "Pluronics" have the general formula:

$$HO(OC_2H_4O)_a(C_3H_6O)_b(C_2H_4O)_cH$$

where $a$, $b$ and $c$ are integers between 1 and about 100. As the ratio of $b$ to $a$ and $c$ increases, the compounds become less water soluble or more oil soluble and thus more hydrophobic, while as the ratio decreases the compounds become more water soluble and less oil soluble. An example of this class is "Pluronic L–64" which has a cloud point of about 140°F. and a polyoxypropylene chain having a molecular weight of 1,500 to 1,800 and a polyoxyethylene content that is 40 to 50 percent of the total weight of the molecule. Another useful example is "Pluronic F–68," a polyoxyethylene-polyoxypropylene glycol having a cloud point of about 212°F. and a polyoxyethylene content of about 80 to 90 percent of the total weight of the molecule.

A class of suitable emulsifying agents are a series of ethylene oxide adducts of acetylenic glycols sold commercially under the name "Surfynols." This class of compounds can be represented by the formula:

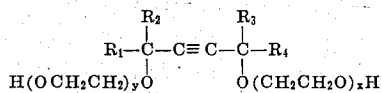

in which $R_1$ and $R_2$ are alkyl radicals containing from three to 10 carbon atoms, $R_2$ and $R_3$ are selected from the group consisting of methyl and ethyl, and $x$ and $y$ are integers having a sum in the range of 3 to 60, inclusive.

Representative of the "Surfynols" are "Surfynol 365" which is an ethylene oxide adduct of 2,4,7,9-tetramethyl decynediol containing an average of 10 moles of ethylene oxide per mole of the surface active agent. "Surfynol 485" corresponds to "Surfynol 465" but contains an average of 30 moles of ethylene oxide per mole of surface active agent. "Surfynol 485" has a cloud point above 212°F.

Anionic emulsifying agents which can be employed herein include anionic compounds obtained by sulfonation of fatty derivatives such as sulfonated tallow, sulfonated vegetable oils and sulfonated marine animal oils. Commercially available emulsifiers of this group are Tallosan RC, a sulfonated tallow marketed by General Dyestuff Corporation; Acidolate, a sulfonated oil marketed by White Laboratories, Inc.; and Chemoil 412, a sulfonated castor oil marketed by Standard Chemical Company.

Various sulfonated and sulfated fatty acid esters of mono- and polyvalent alcohols are also suitable such as Nopco 2272R, a sulfated butyl ester of a fatty ester marketed by Nopco Chemical Company; Nopco 1471, a sulfated vegetable oil marketed by Nopco Chemical Company; Sandozol N, a sulfated fatty ester marketed by Sandoz, Inc.; and Stantex 322, an ester sulfate marketed by Standard Chemical Products, Inc.

Sulfated and sulfonated fatty alcohols are also useful as an emulsifier and include anionic agents such as Duponal ME, a sodium lauryl sulfate, Duponal L142, a sodium cetyl sulfate, Duponal LS, a sodium oleyl sulfate which is marketed by E. I. duPont de Nemours and Company; and Tergitol 4, a sodium sulfate derivative of 7-ethyl-2-methyl, 4-undecanol, Tergitol 7, a sodium sulfate derivative of 3,9-diethyl tridecanol-6 and Tergitol 08, a sodium sulfate derivative of 2-ethyl-1-hexanol, which are marketed by Union Carbide Corporation, Chemical Division.

A particularly useful class of anionic surfactants which can be employed comprises the $C_1$ to $C_{12}$ alkyl and $C_5$ to $C_8$ cycloalkyl esters of alkali metal sulfoalkanedioic acids having from three to about six carbons. Examples of these include diethyl sodium sulfosuccinate, di-n-octyl potassium sulfosuccinate, dicyclohexyl lithium sulfoglutarate, di(methylcyclopentyl)sodium sulfoadipate, dicycloheptyl cesium sulfomalonate, diamyl sodium sulfoadipate, etc.

The half esterified, half ethoxylated derivatives of the aforementioned alkali metal sulfoalkanedioic acids are preferred emulsifiers. These agents have one of the carboxylic acid sites esterified with a $C_1$ to $C_{12}$ alkanol or $C_5$ to $C_8$ cycloalkanol and the remaining carboxylic acid site condensed with from 2 to about 20, preferably from 8 to 16 and, most preferably, from 10 to 12 ethylene oxide units per mole to add a polyethoxylol group. Examples of these are: hexyl polyethoxylol sodium sulfosuccinate, isopropyl polyethoxylol potassium sulfoglutarate, decyl polyethoxylol lithium sulfoadipate, cyclohexyl polyethoxylol cesium sulfomalonate, cycloheptyl polyethoxylol sodium sulfosuccinate, cyclooctyl polyethoxylol potassium sulfosuccinate, etc.

The polymerization is initiated by a water soluble free radical initiator such as a water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., as sodium metasulfite, potassium metabisulfite, sodium pyrosulfite, etc. A particularly preferred reducing agent is sodium or potassium formaldehyde sulfoxylate such as Formopon marketed by Rohm and Haas Company. The presence of the reducing agent in the polymerization medium achieves a release of free radicals at a lower temperature than necessary in its absence and thereby promotes formation of higher molecular weight copolymer products. The amount of reducing agent which can be employed throughout the copolymerization generally varies from about 0.1 to 3 weight percent of the amount of polymer, however, in a preferred embodiment, the reducing agent is only employed to initiate the reaction and hence is necessary only in small amounts which is generally between about 0.001 to 0.02 weight percent of polymer produced.

A protective colloid can be used to increase the adhesiveness of films prepared from the latex. The amount used can be from 0.1 to 3, preferably from 0.5 to 1.5 weight percent of the total monomer weight. When the protective colloid is used, it is desirable to decrease the amount of surfactant used by an amount equivalent to the weight of the protective colloid, since the latter also aids the stability of the latex. This agent can be any of a wide range of compounds that are available for use as protective colloids, including many natural substances such as casein, natural gums, gelatins, agar, dextrin and globulin; suitably chemically modified polysaccharides such as hydrolyzed starch, hydroxyethyl cellulose, methyl cellulose, carboxymethyl cellulose and synthetic protective colloids such as polyvinyl alcohol, alkali metal or ammonium salts of sulfonated polystyrene, water soluble interpolymers of acrylic acid and 2-ethylhexyl acrylate, copolymers of acrylamide and acrylic acid, partially hydrolyzed polyacrylamide having from 10 to 70 percent of its amide groups as carboxylic acid or alkali metal carboxylate groups, etc. The polyvinyl alcohols which are prepared by hydrolysis of polyvinyl esters, typically polyvinyl acetate, are preferred protective colloids and can be used with from 80 to 100 percent, preferably from about 90 to 100 percent of the ester groups hydrolyzed to hydroxyl groups.

The polymerization can be performed by batch polymerization wherein all the polymerization medium, emulsifier and comonomers are charged to the reaction vessel and the polymerization is started by thermal or redox reduction of the initiator. In a continuous process, the same materials can be continuously charged to a reactor.

The preferred procedure is a modified batch processing wherein the major amounts of some or all the comonomers and emulsifier are charged to the reaction vessel after polymerization has been initiated. In this manner, control over the copolymerization of monomers having widely varied degrees of reactivity can be achieved.

It is preferred to add the vinyl ester intermittently or continuously over the polymerization period. The film-forming temperature regulating comonomers such as the acrylates, methacrylates or nitriles can be charged intermittently or continuously with the vinyl acetate or can be charged entirely to the reactor at the start of polymerization.

The ethylene content of the interpolymer depends on the ethylene content of the aqueous polymerization medium. Factors which control the ethylene content of the polymerization medium include the partial pressure of ethylene in the vapor phase over the medium, the temperature of polymerization and the degree of mixing between the vapor phase and the liquid medium. Generally the polymerization is performed at temperatures from 120° to 175°F. and, at these temperatures, ethylene partial pressures from 50 to 1,000, preferably from 250 to 750 psig. are sufficient to incorporate from 1 to 30, preferably from 5 to 25, weight percent ethylene in the polymer. The reaction medium is preferably agitated with a stirrer, however, other agitation can be used such as sparging the liquid with recirculated ethylene from the vapor phase. In the preferred procedure, the ethylene partial pressure is maintained constant throughout the polymerization period so that this monomer is continuously supplied at a constant rate.

The methacrylamide and acrylamide derivatives that are used as the acid curable crosslinking comonomer, i.e., N-alkyl methacrylamide or acrylamide or the formaldehyde condensates of the N-3-oxohydrocarbyl acrylamides, are preferably slowly added during polymerization to avoid an excessive increase in viscosity of the latex which otherwise occurs when the entire amount of these comonomers is added to the initial charge to the polymerization vessel. The polymerizable acid catalyst is also, preferably, continuously or intermittently added during the polymerization. From 40 to 100 percent of the amount of these comonomers can be added in this fashion, the balance, if any, being introduced with the initial charge.

The entire quantity of the synergistic crosslinking comonomer can be added to the initial charge at the outset of polymerization. If desired, substantial amounts, e.g., from 40 to 100 percent of the total amount of this comonomer, is preferably intermittently or continuously added during the polymerization. Some of these comonomers such as the allyl esters are relatively less reactive and it is, therefore, preferred to add these comonomers at a sufficient rate that their addition is completed for a substantial period, e.g., about 15 minutes to about 2 hours, before addition of the last of other monomers has been completed. In this manner, accumulation of the slower reacting monomer in the latex, which causes its coagulation, is avoided.

The emulsifier used in the polymerization can also be added, in its entirety, to the initial charge to the polymerization zone or a portion of the emulsifier, e.g., from 90 to 25 percent thereof, can be added continuously or intermittently during polymerization.

The latexes produced by the polymerization can contain from about 35 to 65 weight percent solids comprised chiefly of the interpolymer. The preferred contents of solids are from 40 to 60, and, most preferred, from 50 to about 60 weight percent. The particle size of the latex is quite small, generally less than 1.0 micron and, preferably, less than about 0.5 micron.

The latexes can be cured into crosslinked polymer films by addition of an acidic additive to lower their pH value to about 3 shortly before application followed by heating of the film of the latex to a temperature from about 250° to 350°F. after its application to the substrate. The amount of acidic additive can be from about 0.2 to 2 weight percent of the latex, sufficient to effect the necessary lowering of the pH of the latex. Various acidic additives can be used for this purpose including inorganic acids such as sulfuric, nitric, orthophosphoric, polyphosphoric, hydrochloric, hydrofluoric acids, etc.; as well as organic $C_1$ to about $C_6$ alkyl and $C_6$ to about $C_9$ aryl sulfonic acids such as: methane, ethane, isopropane, butane, 2-methylbutane, hexane sulfonic acids, etc.; benzene, p-toluene, cumene, ethylbenzene, xylene sulfonic acids, etc. Salts of these acids with fugative, i.e., volatilizable bases such as the ammonium and the $C_1$ to $C_5$ alkyl ammonium salts can also be used. Examples of these are: di- and mono- ammonium orthophosphate, ammonium nitrate, ammonium p-toluene sulfonate, amyl ammonium chloride, dimethyl ammonium fluoride, methyl ammonium cumene sulfonate, etc.

The following examples will illustrate a mode of practice of the invention and demonstrate results attainable therewith:

EXAMPLE 1

A jacketed autoclave reactor of half-gallon capacity provided with an electric stirrer is used in the following examples. The autoclave is fitted with a thermometer and an inlet to introduce ethylene and inlets to introduce liquid monomer mixtures during the polymerization. A steam line and a cooling water line are connected to the jacket to provide heating and cooling, respectively, of the autoclave contents.

The reactor is charged with 475 grams water, 63.8 grams Triton X–405 (70 percent aqueous solution of octylphenol condensed with an average of 40 ethylene oxide units), 8 grams Pluronic F68 (a block copolymer of ethylene and propylene oxides having a polyoxypropylene molecular weight of 1,501–1,800 and 80 percent of the molecule being polyoxyethylene), 72 grams vinyl acetate and 3 grams potassium persulfate. The reactor is flushed by pressuring to 100 psig., then venting three times with nitrogen and twice with ethylene. Thereafter the reactor is pressured to 400 psig. with ethylene and heated to 160°F. The ethylene pressure is maintained at 500 psig and the stirring rate at 300 revolutions per minute throughout the polymerization.

When the temperature reaches 160°F. there is slowly added a solution of 2.1 grams diallyl maleate in 300 grams vinyl acetate followed by 320 grams vinyl acetate over a 2-hour period. There is also added slowly throughout this 2-hour period 12 grams of a 60 weight percent aqueous solution of N-methylolacrylamide dissolved in 25 grams water.

The polymerization is continued for 6 hours after the reactor contents have reached 160°F. The autoclave is then cooled, depressured and its contents removed. The latex is found to contain 60.2 weight percent solids and 1.8 weight percent residual monomer. The latex has a viscosity of 1,050 centipoises at 24°C. and a pH of 2.3. The polymer contains 10.5 weight percent ethylene.

A film of the latex, 6 mils thick, is applied to a glass plate which is placed in an oven at 270°F. for 3 minutes. The plate is then removed, cooled and immersed in benzene for 16–18 hours at 75°F. and the film remaining undissolved is found to be 76.4 weight percent, indicating a high degree of crosslinking.

EXAMPLE 3

The experiment is repeated using identical amounts of reagents and procedure except that the solution of N-methylolacrylamide is not added during polymerization and 2.6 grams sodium bicarbonate are added to the initial charge to the autoclave.

The resultant latex has a solids content of 60.0 weight percent with 1.4 weight percent residual monomer. Its viscosity is 1,475 centipoises at 24°C. and pH is 5.1. The polymer contains 13.3 weight percent ethylene.

A film of the latex applied to glass and cured identically to that in Example 1 dissolves almost completely in benzene after 16–18 hours immersion at 75°F., only 8 to 9 weight percent remaining undissolved.

EXAMPLE 3

Example 1 is repeated with identical amounts of reagents and procedure except that diallyl maleate is not added during polymerization and 2.6 grams sodium bicarbonate are added to the initial charge.

The resultant latex contains 62.8 weight percent solids and 1.8 weight percent residual monomer. The latex has a viscosity of 3,625 centipoises at 24°C. and a pH of 5.4. The polymer contains 10.5 weight percent ethylene.

A film of the latex applied to glass, cured and tested in an identical manner to that of the preceding examples is found to remain only from 3.6 to 4.6 weight percent undissolved in benzene.

EXAMPLE 4

In the following examples, the polymerization is performed in a half-gallon, laboratory flask equipped with a stirrer, thermometer and reflux condenser. Provision is made to surround the flask with an electric heating mantle or a cooling bath for control of the temperature.

The flask is charged with 680 milliliters water, 87 grams Triton X405, 11.2 grams Aerosol MA80, (an 80 weight percent solution of the di-n-hexyl ester of sodium sulfosuccinic acid), 4 grams sodium bicarbonate, 76 grams vinyl acetate and 13 grams butyl acrylate followed by 50 grams water which is used to rinse the inlet line into the flask. The flask contents are heated to 160°F. and then the following mixtures are slowly and simultaneously added at a rate just insufficient to cause any excessive refluxing of the flask contents or increase in the polymerization temperature:

| | |
|---|---|
| Mixture 1 | |
| vinyl acetate | 688 grams |
| butyl acrylate | 122 |
| diallyl maleate | 0.25 |
| Mixture 2 | |
| potassium persulfate | 0.7 |
| water | 40 |
| N-methylolacrylamide | 45 |

The flask contents are maintained at 160°F. with stirring for 6 hours, then cooled and the latex product is recovered. The latex is found to contain 52 percent solids and have a pH of 5.0 and a viscosity of 800 centipoises at 24°C.

A sample of the latex is mixed with 1 weight percent orthophosphoric acid and portions thereof are applied to glass plates to form films of about 6 mils thickness on the plates which dry to films of about 3 mils thickness. One plate is held at room temperature for 4 hours and a second plate is placed in an oven at 270°F. for 20 minutes. After this curing, the plates are soaked in benzene at 75°F. for 16–18 hours and the weight percent of the film remaining undissolved is as follows:

| Cure | % Solvent Resistant |
|---|---|
| 4 hours at room temperature | 46.8 |
| 20 minutes at 270°F. | 91.0 |

EXAMPLE 5

The polymerization is repeated with the substitution of 90 grams 2-ethylhexyl acrylate for the butyl acrylate used in Example 4. The resultant latex contains 49.1 weight percent solids, its viscosity is 550 centipoises at 24°C. and its pH is 3.2.

A sample of the latex is admixed with 1 weight phosphoric acid and portion of the latex with and without the added phosphoric acid are filmed onto glass plates. One set of the plates is held at room temperature for 4 hours and the other set of plates is placed in an oven at 270°F. for 20 minutes. The plates are then placed in benzene at 75°F. for 16–18 hours and the weight percent of the film remaining undissolved is determined. The results are as follows:

| Sample | Cure | Undissolved |
|---|---|---|
| Without $H_3PO_4$ | 4 hours at room temperature | 34.5 wt. % |
| Without $H_3PO_4$ | 20 minutes at 270°F. | 70.1 |
| Without 1% $H_3PO_4$ | 4 hours at room temperature | 38.3 |
| With 1% $H_3PO_4$ | 20 minutes at 270°F. | 87.6 |

Viscosities reported herein are determined at 24°C.

The latexes as prepared herein have sufficient stability to insure a long shelf life. In some instances, however, stability under high shear conditions is desirable. This stability is commonly referred to as mechanical stability and is determined by placing a sample of the latex in a Waring blender operated at a high speed for up to about 15 minutes. If the latex sample remains stable after this treatment, the latex has excellent mechanical stability. Such stability can be imparted to the latexes by a post polymerization treatment. This treatment comprises adjustment of the latex pH, when necessary, to raise its value to 6.5 to 8.5, preferably to 7.0 by the addition of a volatilizable base such as ammonia, ammonium hydroxide and the $C_1$ to $C_5$ alkyl amines, e.g., methyl amine, trimethyl amine, amyl amine, etc., and the addition of from 0.5 to 1.5 percent of the polymer weight of an anionic surfactant. A typical preferred post treatment would comprise the addition of ammonium hydroxide to raise the latex pH to 7.0 and the addition of 1 weight percent Aerosol MA-80, dihexyl sodium sulfosuccinate.

The preceding examples are intended solely to illustrate the presently preferred mode of practice of the invention and to demonstrate results obtainable therewith. It is not intended that the examples be construed as unduly limiting of the invention, but instead, that the invention be defined by the reagents and conditions, and their obvious equivalents, set forth in the following claims.

We claim:

1. An aqueous emulsion of a vinyl ester polymer having the property of forming curable, crosslinked films with high solvent resistance which comprises water, from 1 to about 10 weight percent of an anionic or nonionic surfactant or mixture thereof and from 30 to about 65 weight percent of a polymer comprising:
 a major proportion of a vinyl ester of a $C_1$ to $C_{10}$ alkanoic acid interpolymerized with
 from 1 to 30 weight percent ethylene, an alpha,beta-ethylenically unsaturated $C_3$ to $C_6$ nitrile, a $C_1$ to $C_{10}$ alkanol ester of methacrylic or acrylic acid or mixtures thereof sufficient to modify the film forming temperature of said polymer;
 from 0.5 to 5.0 weight percent of an acid curable crosslinkable comonomer comprising acrylamide or methacrylamide bearing a N-$C_1$ to $C_{10}$ alkylol substituent
 from 0.01 to 2.0 weight percent of a crosslinkable comonomer comprising a mono or di ester of a terminally unsaturated $C_2$ to $C_6$ alcohol with alpha,beta-ethylenically unsaturated $C_3$ to $C_6$ acids.

2. The latex of claim 1 wherein said vinyl ester is vinyl acetate.

3. The latex of claim 2 wherein ethylene constitutes from 5 to 25 weight percent of the polymer.

4. The latex of claim 2 wherein said acid curable crosslinking comonomer is an N-alkylolacrylamide.

5. The latex of claim 4 wherein said N-allylolacrylamide is N-methylolacrylamide.

6. The latex of claim 4 wherein said crosslinkable comonomer is a di ester of an ethylenically unsaturated alkendioic acid and a terminally unsaturated $C_2$ to about $C_6$ alkenol.

7. The latex of claim 6 wherein said ester is diallyl maleate.

8. The latex of claim 2 wherein said emulsifier is a nonionic emulsifier.

9. The latex of claim 8 wherein said emulsifier comprises a mixture of a condensate of from 5 to 30 ethylene oxide units with an alkylphenol of 10 to 18 carbons and a block copolymer of polyoxypropylene and polyoxyethylene of the formula:
 $HO(C_2H_4O)_a(C_3H_6O)_b(C_2H_4O)_c$
 wherein a, b and c are integers between 1 and about 100.

10. The latex of claim 2 wherein said acid catalyst is acrylic or methacrylic acid.

11. The latex of claim 1 wherein said comonomer is butyl acrylate.

12. The latex of claim 1 wherein said comonomer is 2-ethylhexyl acrylate.

13. An aqueous latex of a vinyl ester polymer having the property of forming curable, crosslinked films with high solvent resistance which comprises water, from 1 to about 10 weight percent of an anionic or nonionic surfactant or mixtures thereof and from 30 to 65 weight percent of a polymer consisting essentially of:

ethylene, an alpha,beta-ethylenically unsaturated $C_3$ to $C_6$ nitrile, a $C_1$ to $C_{10}$ alkanol ester of methacrylic or acrylic acid or mixtures thereof in an amount from 5 to 25 weight percent, sufficient to modify the film-forming temperature of said polymer;

from 0.5 to 5.0 weight percent of an N-$C_1$ to $C_6$ alkylolacrylamide or methacrylamide;

from 0.01 to about 2.0 weight percent of a cross-linkable comonomer which is a di- ester of a terminally unsaturated $C_2$ to about $C_6$ alkenol with a $C_2$ to about $C_6$ alkenedioic acid; and the balance of said polymer being a vinyl ester of a $C_1$ to $C_{10}$ alkanoic acid.

14. A latex of claim 13 wherein said vinyl ester is vinyl acetate.

15. The latex of claim 14 wherein said polymer contains from 5 to 25 weight percent ethylene.

16. The latex of claim 14 wherein said alkenol ester is butyl acrylate.

17. The latex of claim 14 wherein said alkenol ester is 2-ethylhexyl acrylate.

18. The latex of claim 15 wherein said N-$C_1$ to $C_{10}$ alkylolacrylamide or methacrylamide is N-methylolacrylamide.

19. The latex of claim 16 wherein said N-$C_1$ to $C_{10}$ alkylolacrylamide or methacrylamide is N-methylolacrylamide.

20. The latex of claim 17 wherein said N-$C_1$ to $C_{10}$ alkylolacrylamide or methacrylamide is N-methylolacrylamide.

21. The latex of claim 18 wherein said cross-linkable comonomer is diallyl maleate.

22. The latex of claim 18 wherein said cross-linkable comonomer is diallyl maleate.

23. The latex of claim 20 wherein said cross-linkable comonomer is diallyl maleate.

24. The latex of claim 13 having an improved stability with a pH from 6.5 to 8.5 and being prepared by the addition to the latex after its polymerization of from 0.5 to 1.5 weight percent based on the polymer weight of an anionic surfactant and a sufficient quantity of ammonia, ammonium hydroxide or a $C_1$ to $C_5$ alkylamine to raise the pH of said latex to said value.

25. The latex of claim 19 wherein said anionic surfactant is di-n-hexylsodium sulfosuccinate.

* * * * *